US010926191B2

(12) United States Patent
Olovsson

(10) Patent No.: US 10,926,191 B2
(45) Date of Patent: *Feb. 23, 2021

(54) SYSTEM FOR PREPARING SOLUTIONS FOR CHROMATOGRAPHY

(71) Applicant: Cytiva Sweden AB, Uppsala (SE)

(72) Inventor: Bjorn Markus Olovsson, Uppsala (SE)

(73) Assignee: Cytiva Sweden AB, Uppsala (SE)

(*) Notice: Subject to any disclaimer, the term of this patent is extended or adjusted under 35 U.S.C. 154(b) by 219 days.

This patent is subject to a terminal disclaimer.

(21) Appl. No.: 15/533,405

(22) PCT Filed: Dec. 10, 2015

(86) PCT No.: PCT/EP2015/079267
§ 371 (c)(1),
(2) Date: Jun. 6, 2017

(87) PCT Pub. No.: WO2016/092023
PCT Pub. Date: Jun. 16, 2016

(65) Prior Publication Data
US 2017/0326474 A1 Nov. 16, 2017

(30) Foreign Application Priority Data
Dec. 12, 2014 (GB) .................................. 1422107

(51) Int. Cl.
B01D 15/16 (2006.01)
B01D 15/22 (2006.01)
(Continued)

(52) U.S. Cl.
CPC .......... B01D 15/166 (2013.01); B01D 15/22 (2013.01); B01F 3/088 (2013.01); B01F 5/0403 (2013.01);
(Continued)

(58) Field of Classification Search
CPC ...... B01D 15/08; B01D 15/166; B01D 15/22; B01D 15/16; B01D 15/265; B01D 15/26;
(Continued)

(56) References Cited

U.S. PATENT DOCUMENTS 2,343,454 A * 3/1944 Harnett .................. B01F 3/088
366/141
3,389,689 A * 6/1968 Huis .................. A01K 39/0125
119/57.4
(Continued)

FOREIGN PATENT DOCUMENTS

CN 1843553 A 10/2006
EP 0236990 A2 9/1987
(Continued)

OTHER PUBLICATIONS

Chinese Office Action for CN Application No. 201580067421.9 dated May 18, 2018 (26 pages with English translation).
(Continued)

Primary Examiner — Joseph W Drodge
(74) Attorney, Agent, or Firm — Eversheds Sutherland (US) LLP

(57) ABSTRACT

A system for preparing solutions for chromatography application is disclosed. The system comprises a T-joint for preparing a buffer solution by mixing at least one first solution and a second solution. The T-joint receives the second solution from a solution supply unit connected to the T-joint. Further one or more low pressure pumps supply the one or more first solutions into the T-joint. The high pressure pump collects the buffer solution and delivers it to a chromatography apparatus.

14 Claims, 2 Drawing Sheets

(51) Int. Cl.
| | | |
|---|---|---|
| *B01F 3/08* | (2006.01) | |
| *G01N 30/32* | (2006.01) | |
| *G01N 30/34* | (2006.01) | |
| *B01F 5/04* | (2006.01) | |
| *B01F 15/00* | (2006.01) | |
| *B01F 15/02* | (2006.01) | |
| *G01N 30/86* | (2006.01) | |

(52) U.S. Cl.
CPC .... *B01F 15/0022* (2013.01); *B01F 15/00227* (2013.01); *B01F 15/00344* (2013.01); *B01F 15/0243* (2013.01); *G01N 30/32* (2013.01); *G01N 30/34* (2013.01); *B01D 15/16* (2013.01); *G01N 30/8658* (2013.01); *G01N 2030/324* (2013.01); *G01N 2030/347* (2013.01)

(58) Field of Classification Search
CPC ........ B01D 15/24; B01D 15/20; B01D 15/18; B01D 15/14; B01D 15/125; B01D 15/12; B01D 15/10; B01D 2265/00; B01D 2265/02; B01D 2265/06; B01D 2201/00; B01D 2201/30; B01D 2201/20; B01D 2201/202; B01D 2201/204; B01D 2201/208; B01D 2201/31; B01D 2201/40; B01F 3/088; B01F 15/0022; B01F 15/00227; B01F 15/00344; B01F 15/0243; B01F 15/00207; B01F 15/00259; B01F 15/04; B01F 15/0404; B01F 15/0412; B01F 15/0416; B01F 15/042; G01N 30/32; G01N 30/34; G01N 2030/324; G01N 30/347; G01N 30/26; G01N 30/28; G01N 30/38; G01N 2030/201; G01N 2030/342; G01N 2030/345; G01N 2030/347; G01N 30/8658
USPC ........... 210/96.1, 101, 198.2, 656; 73/61.56; 366/152.1, 152.2, 152.4, 160.2, 160.3, 366/160.4; 422/70, 161
See application file for complete search history.

(56) References Cited

U.S. PATENT DOCUMENTS

| | | | | |
|---|---|---|---|---|
| 4,032,445 A * | 6/1977 | Munk | ............... | G01N 30/32 210/103 |
| 4,128,476 A * | 12/1978 | Rock | ............... | B01D 15/166 210/101 |
| 4,239,623 A * | 12/1980 | Schrenker | ............. | B01D 15/08 210/198.2 |
| 4,311,586 A * | 1/1982 | Baldwin | ............... | B01D 15/08 210/101 |
| 4,595,496 A * | 6/1986 | Carson | ................ | G05D 11/132 210/101 |
| 4,942,018 A * | 7/1990 | Munk | ................... | G01N 30/34 422/70 |
| 5,158,675 A * | 10/1992 | Allington | ............... | G01N 30/34 137/88 |
| 5,180,487 A * | 1/1993 | Saito | ................. | B01D 15/1814 210/101 |
| 5,234,587 A * | 8/1993 | Allington | ............... | G01N 30/34 210/101 |
| 9,327,212 B2 * | 5/2016 | Blank | ................ | B01F 15/0022 |
| 10,773,185 B2 * | 9/2020 | Olovsson | ............... | G01N 27/06 |
| 2007/0144973 A1 * | 6/2007 | Tsonev | ................ | B01D 15/362 210/659 |
| 2009/0175738 A1 | 7/2009 | Shaimi | | |
| 2010/0065495 A1 * | 3/2010 | Shreve | ................... | G01N 30/00 210/635 |
| 2011/0039712 A1 * | 2/2011 | Bjorkesten | ............. | B01D 15/12 506/7 |
| 2012/0217192 A1 * | 8/2012 | Blank | ................. | B01D 15/166 210/143 |
| 2013/0081703 A1 * | 4/2013 | Andrei | ................... | G01N 30/34 137/3 |
| 2013/0306537 A1 * | 11/2013 | Yamazaki | ........... | B01D 15/247 210/198.2 |
| 2014/0367319 A1 * | 12/2014 | Luongo | ................. | B01D 15/14 210/198.2 |

FOREIGN PATENT DOCUMENTS

| | | |
|---|---|---|
| GB | 2454783 A | 5/2009 |
| JP | 2014-085261 A | 5/2014 |
| WO | 2004/103519 A2 | 12/2004 |

OTHER PUBLICATIONS

PCT International Search Report and Written Opinion for PCT Application No. PCT/EP2015/079267 dated Mar. 9, 2016 (8 pages).
GB Search Report for GB Application No. 1422107.1 dated Sep. 10, 2015 (3 pages).
Chinese Office Action for CN Application No. 201580067421.9 dated Aug. 20, 2019 (23 pages with English translation).
Yucheng, "Latest Chromatography Detection Method and Practical Technology Practicality Manual," 2004, Silver Sound and Publishing House, vol. 4 (3 pages).
Japanese Office Action for JP Application No. 2017-531479 dated Sep. 2, 2019 (11 pages with English translation).

* cited by examiner

SYSTEM FOR PREPARING SOLUTIONS FOR CHROMATOGRAPHY

CROSS REFERENCE TO RELATED APPLICATIONS

This application claims the priority benefit of PCT/EP2015/079267 filed on Dec. 10, 2015 which claims priority benefit of Great Britain Application No. 1422107.1 filed Dec. 12, 2014. The entire contents of which are hereby incorporated by reference herein.

FIELD OF THE INVENTION

The subject matter disclosed herein relates to preparing of solutions from stock solutions. More specifically the subject matter relates to a system for preparing solutions from stock solutions for chromatography application.

BACKGROUND OF THE INVENTION

Chromatography is a well-established and valuable technique for separating chemical and biological substances and is widely used in research and industry, finding many applications in compound preparation, purification and analysis. There are many different forms of chromatography, liquid chromatography being of particular importance in the pharmaceutical and biological industries for the preparation, purification and analysis of proteins, peptides and nucleic acids.

A typical liquid chromatography apparatus has an upright housing in which a bed of packing material, which is usually particulate in nature and consists of a porous medium, rests against a permeable retaining layer. A liquid mobile phase enters through an inlet, for example at the top of the column, usually through a porous, perforated filter, mesh or frit, moves through the bed of packing material and is removed via an outlet, typically through a second filter, mesh or frit.

In many cases it is important to obtain liquids of precisely known composition and/or other characteristics, such as pH, ionic strength, viscosity, density etc. It is further not uncommon that the composition of the liquid should not only be at each moment precisely known and controlled, but also should vary with time in a precise and controlled manner Such liquids are usually obtained by mixing or blending two or more liquids with each other, typically using a blending system, usually an on-site blending system, which may provide for both isocratic and gradient blending modes (step gradient and linear gradient). One application where the composition of liquids is of utmost importance is in the field of liquid chromatography, when buffers having a specified pH and optionally also ionic strength are utilized, the pH and ionic strength of the eluent being the two most important parameters that control selectivity of protein separations in chromatography, such as on ion exchange resins. Another such application is filtration.

The current systems include usage of multiple high pressure pumps to deliver different stock solutions such as acid, base and salt along with water to a T-joint for forming the buffer solution that needs to be delivered to the chromatography column. However characteristics of the buffer solution such as pH level and conductivity cannot be determined before supplying to the chromatography column. This is because sensors for determining these characteristics of the solution may not be able to tolerate a pressure level of the solution. The sensors can accommodate only generally a pressure upto 7 bar i.e. 0.7 MPa. Thus the buffer solutions may not have desired characteristics or may have variation in characteristics such as pH level and conductivity. The usage of high pressure pumps also adds to cost of the chromatography system.

Accordingly, a need exists for an improved system for preparing the buffer solutions for chromatography.

SUMMARY OF THE INVENTION

The object of the invention is to provide an improved way of preparing buffer solutions, which overcomes one or more drawbacks of the prior art. This is achieved by a system for preparing buffer solutions for chromatography from stock solutions with a simple and convenient design as defined in the independent claim.

One advantage with the disclosed system for preparing buffer solutions for chromatography from one or more solutions. In this system as low pressure pumps are used to collect and deliver first solutions to a T-joint, sensors placed between the low pressure pumps and a high pressure pump can determine the characteristics of the buffer solution. As low pressure pumps are used the pressure of the buffer solution experienced at the sensors are less hence they can operate normally to determine the characteristics. Further the low pressure pumps render the system less expensive.

In an embodiment a system for performing inline blending of liquids is disclosed. The system comprises a T-joint for preparing a buffer solution by mixing at least one first solution and a second solution. The T-joint receives the second solution from a solution supply unit connected directly to the T-joint. Further one or more low pressure pumps supply the one or more first solutions into the T-joint. The high pressure pump collects the buffer solution and delivers it to a chromatography apparatus.

In another embodiment a chromatography system is disclosed. The chromatography system includes one or more chromatography columns and a T-joint for preparing a buffer solution by mixing at least one first solution and a second solution. The T-joint receives the first solution from a solution supply unit connected directly to the T-joint. Further one or more low pressure pumps supply the one or more first solutions into the T-joint. The high pressure pump collects the buffer solution and delivers it to the one or more chromatography columns.

A more complete understanding of the present invention, as well as further features and advantages thereof, will be obtained by reference to the following detailed description and drawings.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical and other changes may be made without departing from the scope of the embodiments. The following detailed description is, therefore, not to be taken as limiting the scope of the invention.

As discussed in detail below, embodiments of a system for preparing performing inline blending of liquids is disclosed. The system comprises a T-joint for preparing a buffer solution by mixing at least one first solution and a second solution. The T-joint receives the second solution from a solution supply unit connected to the T-joint. Further one or more low pressure pumps supply the one or more first solutions into the T-joint. The high pressure pump collects the buffer solution and delivers it to a chromatography apparatus.

Figure 1:
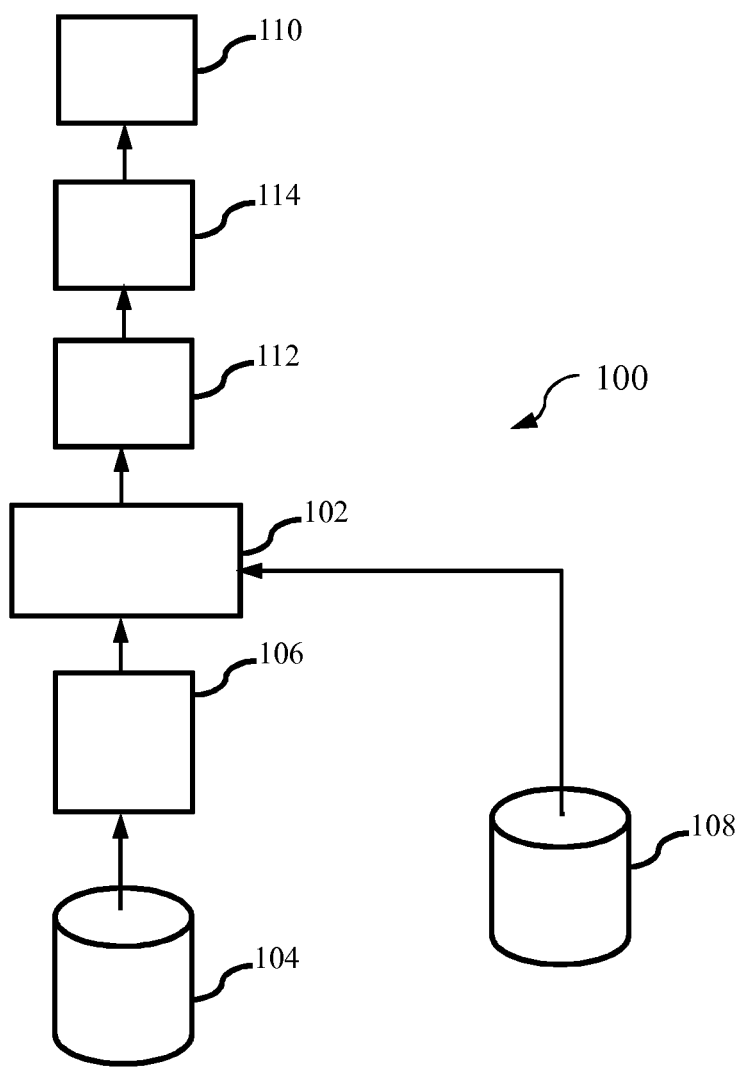
FIG. 1 is a schematic illustration of a system for preparing a buffer solution according to an embodiment.

FIG. 1 illustrates a system 100 for preparing a buffer solution according to an embodiment. The system 100 includes a T-joint 102 for preparing a buffer solution. The T-joint 102 may be but not limited to a mixing unit or blending unit. The buffer solution may be formed using a first solution and a second solution. The first solution is stored in a solution supply unit 104 and a low pressure pump 106 is used to collect and deliver the first solution to the T-joint 102. The low pressure pump 106 may have high flow rate accuracy and thus correct concentration of the first solution is delivered into the T-joint 102. The T-joint 102 is connected to the solution supply unit 108 holding the second solution. In an embodiment a check valve (not shown in FIG. 1) may be provided connecting the T-joint 102 and the solution supply unit 104. The check valve also avoids any mixing that may happen between the first solution and the second solution in the solution supply unit 108. In another embodiment there may be combination of valves and sensors arranged between the connection between the T-joint 102 and the solution supply units 104 and 108 for characterization and chose of solution entering the flow paths. For instance an inlet valve may be present between T-joint 102 and solution supply unit 108 and/or between low pressure pump 106 and solution supply unit 104. The second solution is then delivered to the T-joint 102. The T-joint 102 is configured to mix the first solution and the second solution to form the buffer solution. The T-joint 102 may have internal condition equivalent to atmospheric pressure. In an embodiment the T-joint 102 may include a magnetic stirrer for mixing the first solution and the second solution to form the buffer solution. However it may be envisioned that the T-joint 102 may include multiple configurations for mixing the first solutions and the second solution. Once mixed the buffer solution is pumped by a high pressure pump 110 that operates at a higher pressure as compared to the low pressure pump 106. In an embodiment the high pressure pump 110 may operate at pressure varying from 0 to 20 mega pascals (mPa). This pressure variation between the low pressure pump 106 and the high pressure pump 110 enables the buffer solution to be collected. The buffer solution then passes through one or more sensors such as a sensor 112 and a sensor 114. The buffer solution flowing from the low pressure pump 106 is at a low pressure for instance lesser than a 0.7 MPa. Thus the sensors 112 and 114 can measure the characteristics of the buffer solution due to reduced pressure. For example the sensor 112 monitors a pH level of the buffer solution and the sensor 114 monitors conductivity associated with the buffer solution. The sensor 112 may have a capability of accommodating a pressure ranging from 5 to 6 bar. The conductivity of the buffer solution refers to an electrical conductivity of the buffer solution. The electrical conductivity can be determined by a salt concentration in the buffer solution.

If the characteristics of the buffer solution are not the desired characteristics, then a feedback is provided so that flow-rate of the first solution and the second solution from the solution supply unit 104 and the solution supply unit 108, and the flow rate of the high pressure pump 110 respectively are adjusted. This result in changing the concentration of the buffer solution formed in the T-joint 102 to obtain the buffer solution with desired characteristics.

Figure 2:
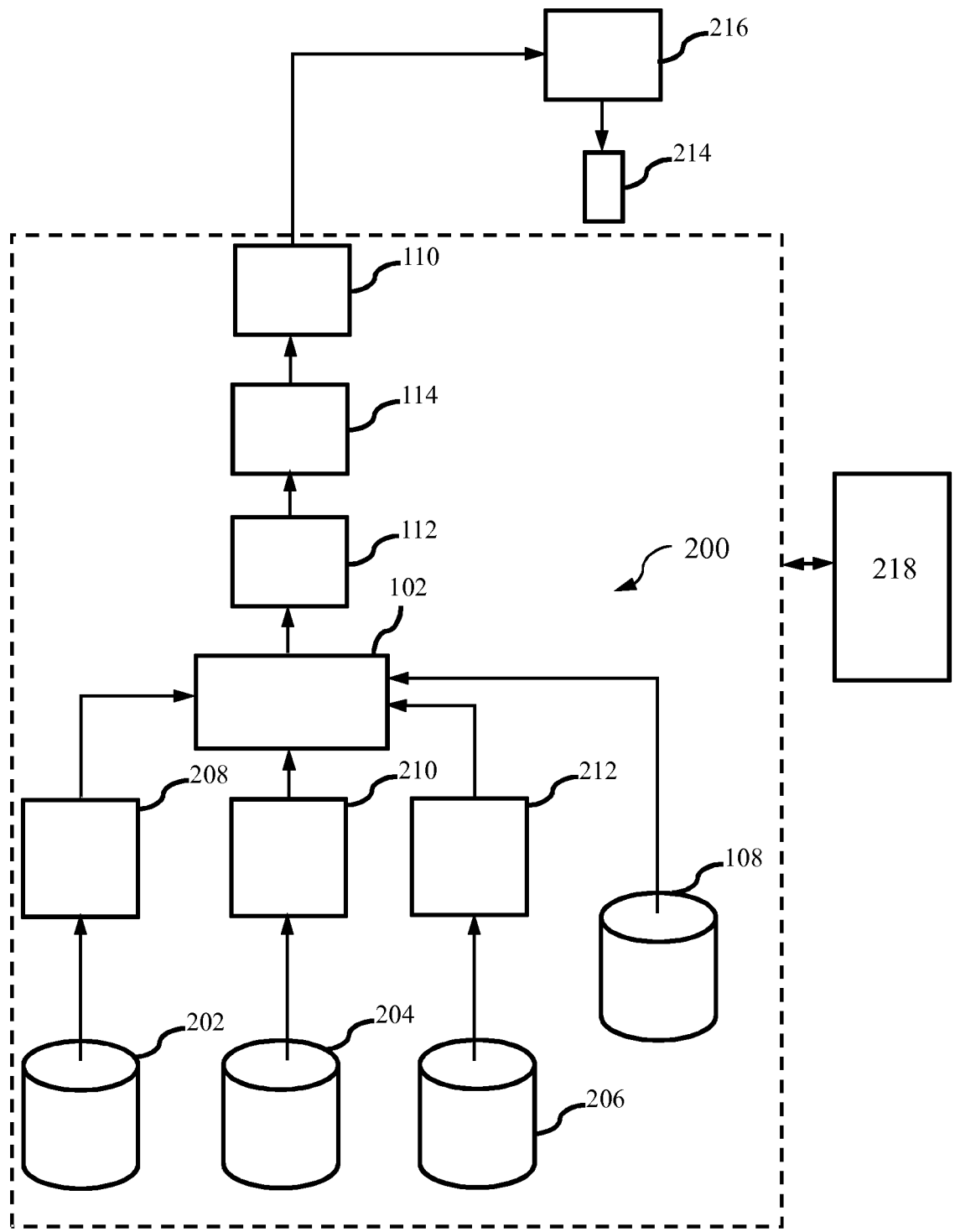
FIG. 2 is a schematic illustration of a system for preparing a buffer solution according to an exemplary embodiment.

FIG. 2 illustrates a system 200 for preparing a buffer solution according to an exemplary embodiment. The system 200 is capable of preparing different buffer solutions having different concentration levels such as a low pH level, a low salt level, a high pH level, a high salt level, a high acidic level and a low acidic level. The system 200 includes a solution supply unit 202 holding acid, a solution supply unit 204 holding salt and a solution supply unit 206 holding a base. The first solutions here include an acid, a salt and a base. It may be envisioned that the system 200 may include solution supply units storing first solutions other than acid, salt and base without deviating from the scope of this disclosure. The system 200 may also include three low pressure pumps such as low pressure pump 208, a low pressure pump 210 and a low pressure pump 212 connected to the solution supply unit 202, the solution supply unit 204 and the solution supply unit 206 respectively. The low pressure pump 208 delivers the acid to the T-joint 102, whereas the low pressure pump 210 delivers the base to the T-joint 102 and the low pressure pump 212 delivers the salt to the T-joint 102. Further the container 108 holding the water is directly connected to the T-joint 102. The water is a second solution. Based on the desired concentration level of a buffer solution, a required amount of acid, base and salt are pumped into the T-joint 102 and simultaneously water also flows into the T-joint 102 from the container 108. In an embodiment the flow rate of the acid, the base and the salt can be varied to deliver buffer solutions of different concentration levels.

The sensors 112 and 114 are capable of measuring the pH level and conductivity of the buffer solution. The sensors 112 and 114 are positioned closer to the low pressure pumps 208, 210 and 212 between the high pressure pump 110 and the low pressure pumps 208, 210 and 212. Further it may be envisioned that sensors other than the sensors 112 and 114 may be placed closer to the low pressure pump 210 without deviating from the scope of this disclosure. As these sensors are closer to the low pressure pump 210 the operation of the sensors 112 and 114 are not affected by any high pressure and hence they can measure the characteristics of the buffer solution. Further the sensors 112 and 114 can also be used to provide feedback to the low pressure pumps 208, 210 and 212 for controlling the flow rate of the first solutions.

Taking an example if a user requires a buffer solution of pH level 4. Then the low pressure pump 208 is set to control the flow rate of the acid from the container 202 at 0.2 ml/minute. Whereas the low pressure pump 210 may be set to control the flow rate of the base at 0.1 ml/minute from the container 204 and the low pressure pump 212 may be set to control the flow rate of the salt at 0.5 ml/min. The high pressure pump 110 may need to pull the buffer solution at a flow rate of 10 ml/min. In this case the water directly flows into the T-joint 102 at a flow rate of 9.2 ml/min. In the T-joint 102 the base, salt and acid are mixed with water to form a buffer solution. The buffer solution in the T-joint 102 is pumped by the high pressure pump 110. The buffer solution may be monitored by the sensors 112 and 114 to determine a pH level and conductivity associated with the buffer solution. If the characteristics of the buffer solution are not the desired one then the flow rate of the solutions from the containers 202, 204 and 206 may be varied so that the buffer solution with the desired characteristics is obtained. The buffer solution is pumped by the high pressure pump 110 and delivered to a chromatography column. The buffer solution may be used for different applications such as separation and filtering of proteins. During the process of filtering or separation of proteins different buffer solutions having varying concentration levels may need to be prepared by the system 200. Accordingly the flow rate associated with the first solutions from the low pressure pump 208, the low pressure pump 210 and the low pressure pump 212 can be modified to obtain a desired buffer solution.

The buffer solution is then supplied to a chromatography column 214. An injection valve 216 may be used to deliver the buffer solution to the chromatography column 214. The injection valve 216 is configured to supply the buffer solution at a high pressure and speed into the chromatography column 214. Based on the purpose in the chromatography column 214 the pressure and speed of delivery of the buffer solution may be varied. The purpose may be for instance a type of protein that needs to be filtered, type of proteins that need to be filtered and so on.

The system 200 may also include a control system 218 that can control the operation of the low pressure pumps, the high pressure pump and the T-joint. The control system 218 may be configured to control the flow rate of the one or more first solutions supplied by the low pressure pumps 208, 210 and 212. In an embodiment the control system 218 may receive feedback from the system 200 for controlling the operation of the low pressure pumps 208, 210 and 212. The control system 218 may be also configured to control the operation of the high pressure pump 110. The high pressure pump 110 can be operated to control the flow rate of the buffer solution.

From the foregoing, it will be appreciated that the above system for preparing buffer solutions for chromatography from first solutions is disclosed. In this system as low pressure pumps are used to collect and deliver first solutions to a T-joint, sensors placed between the low pressure pumps and a high pressure pump can determine the characteristics of the buffer solution. As low pressure pumps are used the pressure of the buffer solution experienced at the sensors are less hence they can operate normally to determine the characteristics. Further the low pressure pumps render the system less expensive.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A system for performing inline blending of liquids, the system comprising:
    at least one first liquid solution disposed in a first solution supply unit;
    a second solution supply unit;
    a T-joint for preparing a buffer solution by mixing the at least one first liquid solution and a second liquid solution, wherein the T-joint receives the second liquid solution from the second solution supply unit connected to the T-joint, and the T-joint is connected to the second solution supply unit (i) through a check valve, and (ii) through at least one direct connection tube;
    at least one low pressure pump for supplying the at least one first liquid solution into the T-joint from the first solution supply unit;
    a high pressure pump for collecting the buffer solution and delivering to a chromatography apparatus; and
    at least one sensor configured to measure one or more characteristics of the buffer solution received at the high pressure pump, wherein the at least one sensor is arranged between the at least one low pressure pump and the high pressure pump the at least one sensor being located closer to the at least one low pressure pump than to the high pressure pump such that operation of the at least one sensor is not affected by high pressure generated by the high pressure pump.

2. The system of claim 1, wherein the at least one first liquid solution comprises at least one of an acid, a base and a salt solution.

3. The system of claim 1, further comprising a control system configured to: control operation of the at least one low pressure pump for supplying the at least one first liquid solution.

4. The system of claim 3, wherein the control system is configured to control a flow rate of the at least one first liquid solution supplied by the at least one low pressure pump, the flow rate of the at least one first liquid solution and a flow rate of the high pressure pump determining concentration of the buffer solution.

5. The system of claim 1, wherein a sensor of the at least one sensor is configured to measure a conductivity associated with the buffer solution.

6. The system of claim 1, wherein a sensor of the at least one sensor is configured to measure a pH level associated with the buffer solution.

7. A chromatography system comprising:
    at least one first liquid solution disposed in a first solution supply unit;
    a second solution supply unit;
    at least one chromatography column;
    a T-joint for preparing a buffer solution by mixing the at least one first liquid solution and a second liquid solution, wherein the T-joint receives the second liquid solution from the second solution supply unit connected to the T-joint, and the T-joint is connected to the second solution supply unit (i) through a check valve, and (ii) through at least one direct connection tube;
    at least one low pressure pump for supplying the at least one first liquid solution into the T-joint from the first solution supply unit;
    a high pressure pump for collecting and delivering the buffer solution to the at least one chromatography column; and
    at least one sensor configured to measure one or more characteristics of the buffer solution received at the high pressure pump, wherein the at least one sensor is arranged between the at least one low pressure pump and the high pressure pump, the at least one sensor being located closer to the at least one low pressure pump than to the high pressure pump such that operation of the at least one sensor is not affected by high pressure generated by the high pressure pump.

8. The chromatography system of claim 7, wherein the at least one first liquid solution comprises at least one of an acid, a base and a salt solution.

9. The chromatography system of claim 7, further comprising a control system configured to: control operation of the at least one low pressure pump for supplying the at least one first liquid solution and control the functioning of the T-joint to prepare the buffer solution.

10. The chromatography system of claim 9, wherein the control system is configured to control a flow rate of the at least one first liquid solution supplied by the at least one low pressure pump, the flow rate of the at least one first liquid solution and a flow rate of the high pressure pump determining concentration of the buffer solution.

11. The chromatography system of claim 7, wherein a sensor of the at least one sensor is configured to measure a conductivity associated with the buffer solution.

12. The chromatography system of claim 7, wherein a sensor of the at least one sensor is configured to measure a pH level associated with the buffer solution.

13. A system for performing inline blending or mixing of liquids in chromatography apparatus, the system comprising:
   a T-joint for preparing a buffer solution by blending or mixing at least two initial liquid solutions;
   a liquid supply for each of the initial liquid solutions, for supplying the respective initial liquid solutions to the T-joint, one or more of the liquid supplies having a pump and one or more of the remaining liquid supplies having no pump, wherein the T-joint is connected to one or more of the liquid supplies (i) through a check valve, and (ii) through at least one direct connection tube; and
   a liquid egress for removing the buffer solution from the T-joint, the liquid egress including a further pump operable at least to draw in solution from the or each liquid supply which has no pump, and operable to deliver the buffer solution to a chromatography apparatus; and
   at least one sensor configured to measure one or more characteristics of the buffer solution received at the further pump, wherein the at least one sensor is arranged between the T-joint and the further pump, the at least one sensor being located closer to the one or more pumps of the liquid supplies than to the further pump such that operation of the at least one sensor is not affected by high pressure generated by the further pump.

14. A system as claimed in claim 13, further comprising a control configured to control a respective flow rate of the at least one first liquid solution supplied by the one or more pumps of the liquid supplies, the respective flow rates of the at least one first liquid solution supplied by the one or more pumps of the liquid supplies and a flow rate of the further pump determining concentration of the buffer solution.

* * * * *